US010709298B2

United States Patent
Yu et al.

(10) Patent No.: US 10,709,298 B2
(45) Date of Patent: Jul. 14, 2020

(54) FAILSAFE WATER SAVING SHOWER HEAD APPARATUS AND METHOD

(71) Applicant: Huei Meng Chang, Milpitas, CA (US)

(72) Inventors: Simon Siu-Chi Yu, Oakland, CA (US); Huei Meng Chang, Milpitas, CA (US)

(73) Assignee: Huei Meng Chang, Milpitas, CA (US)

( * ) Notice: Subject to any disclaimer, the term of this patent is extended or adjusted under 35 U.S.C. 154(b) by 0 days.

(21) Appl. No.: 15/894,936

(22) Filed: Feb. 13, 2018

(65) Prior Publication Data

US 2019/0045980 A1 Feb. 14, 2019

Related U.S. Application Data

(60) Provisional application No. 62/600,151, filed on Feb. 13, 2017.

(51) Int. Cl.
| | |
|---|---|
| A47K 3/28 | (2006.01) |
| F16K 31/02 | (2006.01) |
| B05B 12/12 | (2006.01) |
| B05B 1/18 | (2006.01) |
| E03C 1/04 | (2006.01) |
| E03C 1/02 | (2006.01) |

(52) U.S. Cl.
CPC ............... *A47K 3/28* (2013.01); *B05B 1/18* (2013.01); *B05B 12/122* (2013.01); *F16K 31/02* (2013.01); *E03C 1/0408* (2013.01); *E03C 2001/026* (2013.01)

(58) Field of Classification Search
CPC ........................................................ A47K 3/28
USPC ............................................. 4/605; 251/129
See application file for complete search history.

(56) References Cited

U.S. PATENT DOCUMENTS

| | | | | |
|---|---|---|---|---|
| 5,979,776 A | * | 11/1999 | Williams | G05D 23/1393 |
| | | | | 236/12.12 |
| 2003/0102447 A1 | * | 6/2003 | Williams, Jr. | E03C 1/057 |
| | | | | 251/129.04 |
| 2012/0037834 A1 | * | 2/2012 | Lang, III | E03F 5/08 |
| | | | | 251/368 |

FOREIGN PATENT DOCUMENTS

| | | | |
|---|---|---|---|
| CN | 201997415 U | * | 10/2011 |
| CN | 107773009 A | * | 3/2018 |

OTHER PUBLICATIONS

Derwent English abstract of CN 107773009 printed May 8, 2019 (Year: 2017).*

* cited by examiner

*Primary Examiner* — Christine J Skubinna

(57) ABSTRACT

A fail-safe water saving shower enclosure system includes a showerhead, shower faucet, power adapter, an active infrared sensor, electromagnetic activated fluid valve and shower walls. The infrared sensor installed on one shower wall aims at the opposite shower wall that has the showerhead. The enclosure is electronically partitioned into a restrictive flow zone and free flow zones. When a bather is not present within the restrictive flow zone, the showerhead flows at a free flow rate set at the shower faucet. When the bather does not need water, he simply moves towards the restrictive flow zone. The sensor signals the normally open electromagnetic valve to shut off water from reaching the showerhead. The free flow of water resumes when the bather moves towards the showerhead. The showerhead always receives a full flow of water without the presence of a bather, despite a failure of the disclosed components or power loss.

19 Claims, 5 Drawing Sheets

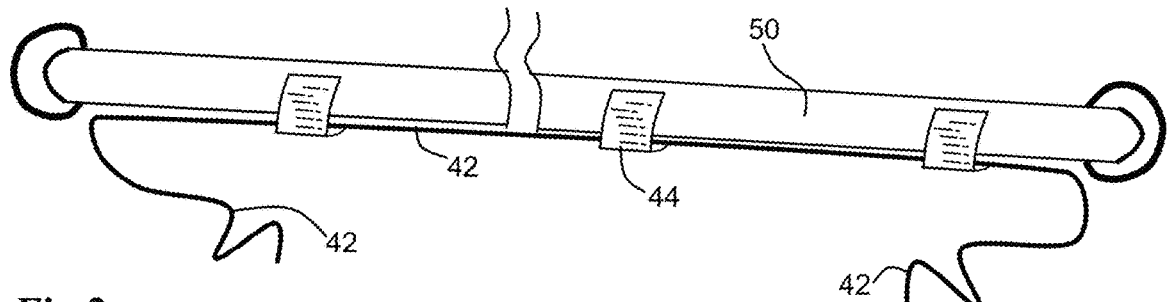
Fig.2
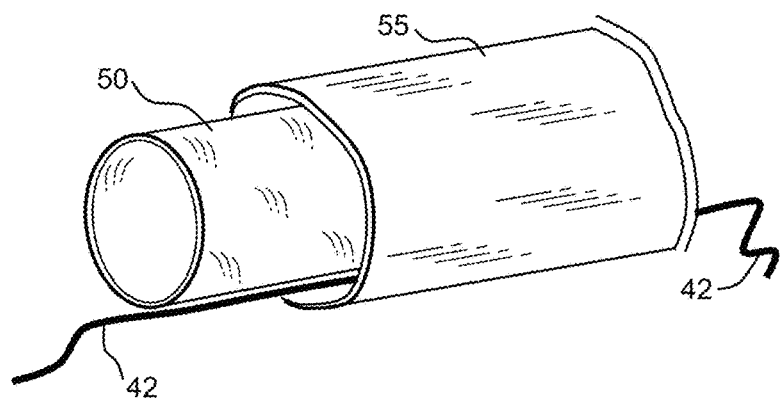
Fig. 2A
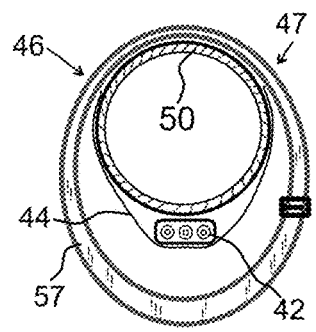
Fig.2B
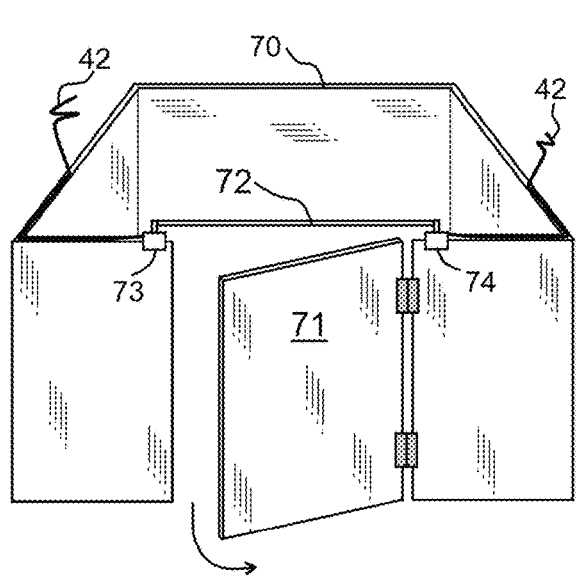
Fig. 3
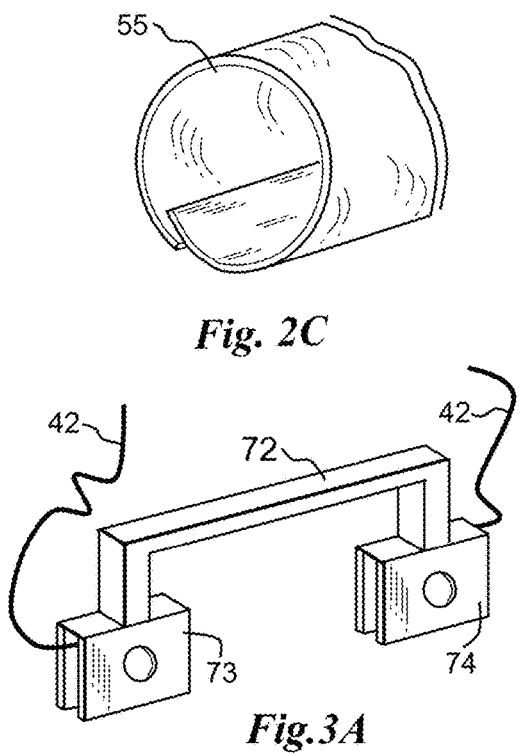
Fig. 2C
Fig.3A

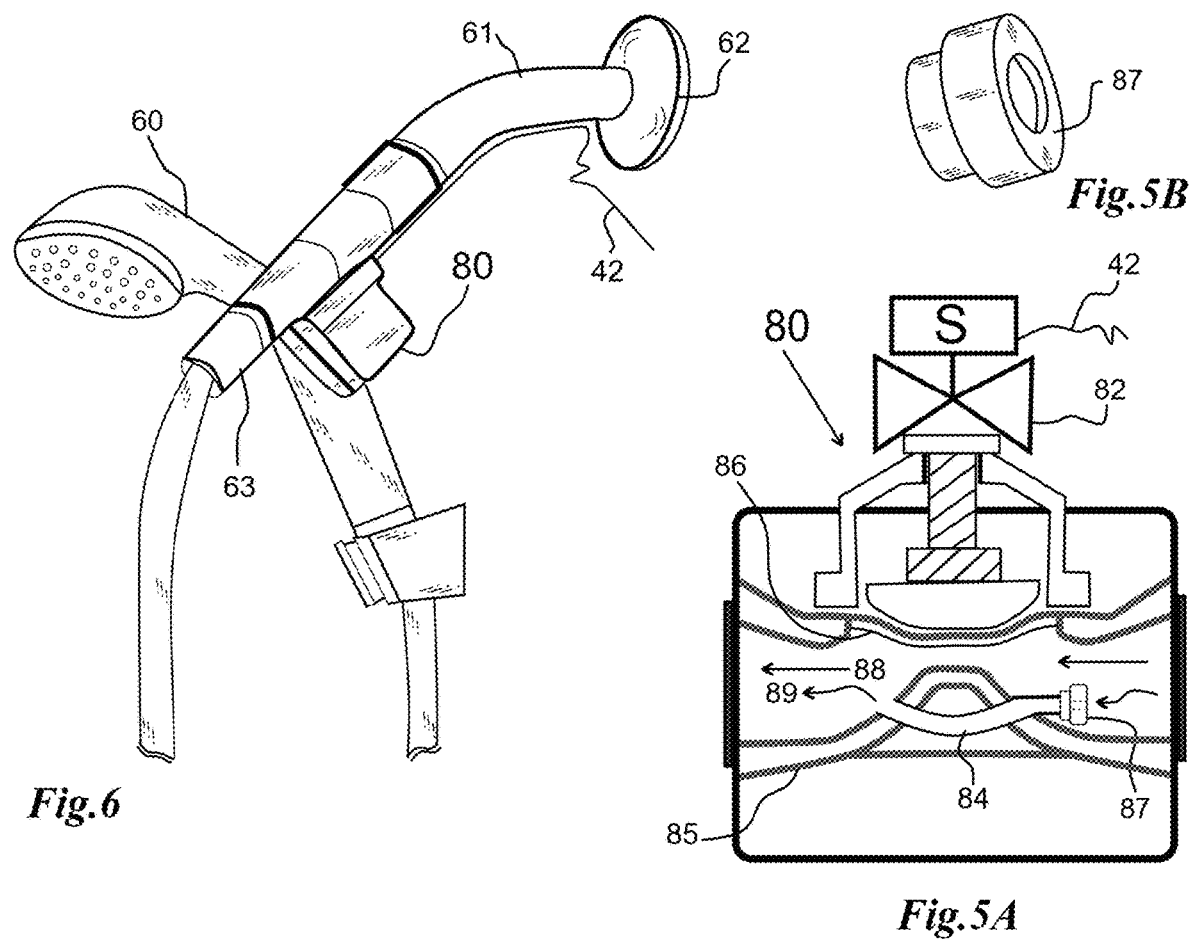
*Fig.5B*
*Fig.6*
*Fig.5A*
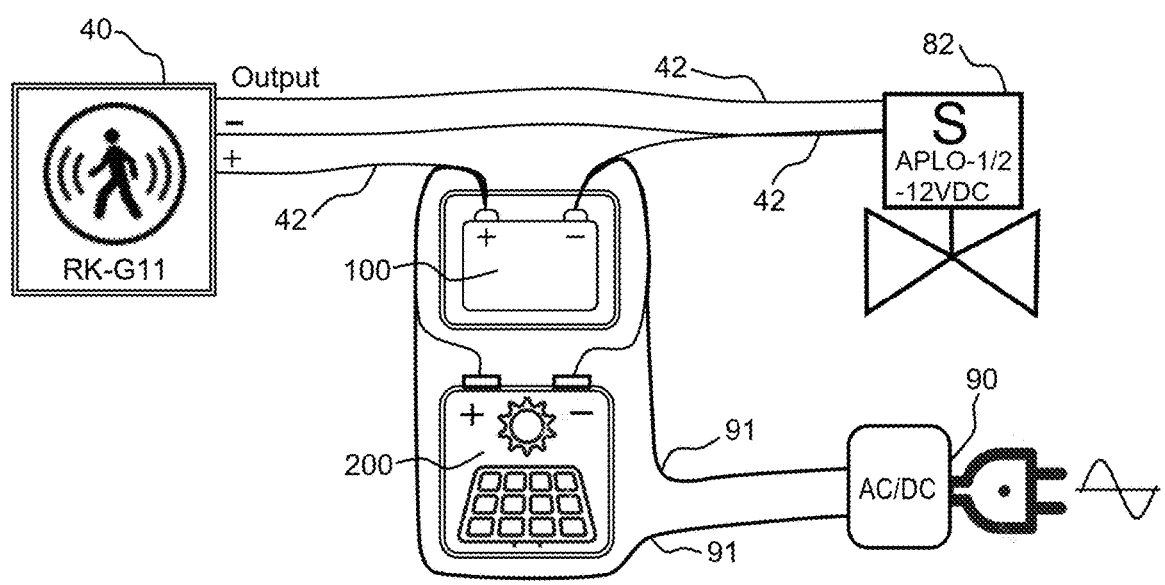
*Fig.7*

FAILSAFE WATER SAVING SHOWER HEAD APPARATUS AND METHOD

CROSS-REFERENCE TO RELATED APPLICATION

This application claims priority to earlier filed U.S. Provisional patent application 62/600,151 titled 'Water Saving Shower Head Apparatus and Method' filed Feb. 13, 2017 by Simon Siu-Chi Yu and is incorporated herein by reference in its entirety.

BACKGROUND OF THE INVENTION

This invention electronically restricts water flow to a showerhead when a detected bather is within its electronically partitioned water restrictive flow zone in a shower enclosure. Taking a shower consumes nearly 20% of total residential water usage according to reports for conventional constructed homes. A conventional showerhead is rated at 2.5 gallons per minute. On average, each bather spends eight minutes in a shower. During 20% of that eight minutes wastes some 20 gallons of good quality potable water doing lathering or shampooing.

This invention deploys a completely hand free, fully automated fail safe and simple to install system allowing consumers to enjoy their shower and help save water at the same time. The invention utilizes a showerhead restrictor system that tracks and measures occupant movement into an electronically partitioned low or no flow zone. The invention saves over four gallons of clean potable water per person per shower on average.

There have been various attempts in the past to propose a water saving showerhead system but none of them performs satisfactory nor economically. Some products offer passive monitoring of excessive water usage then light up indicator lamps to warn a bather it is time to vacate. Some products send water usage data to share and compare with friends via smart phones. Some products punish a bather by shutting off water for period of set time before resuming water flow.

Some products use a normally closed electromagnetic valve fitted with sensors. Other products use a pinch motor to control flow of water. It is a widely known fact that a normally closed electromagnetic valve and a pinch motor can fail in the middle of taking a shower. When such a system fails, water will be shutoff to showerhead. A bather in the middle of shampooing may panic and scramble to seek help while still inside the shower enclosure. However, there is nothing the bather can do in this situation. Therefore, the normally closed valve and pinch motor design are not the optimal solution for controlling showerhead flow and can create a dangerous and hazardous situation because the bather may be unable to open his eyes under a head covered with shampoo.

The present invention offers an advanced water saving showerhead system which is fail safe in an event of system failure that also helps save water and heating energy.

SUMMARY OF THE INVENTION

A water saving shower enclosure system includes a sensor configured to track a bather's position within the shower enclosure to one of a restrictive flow zone and a full flow zone, a relative location of the zones programmable by the bather. The system also includes a Normally Open Electromagnetic Fluid Valve (NOEFV) configured to restrict an amount of water reaching a shower head in the shower enclosure based on a position of the bather detected by the sensor. The system further includes a diversion channel configured to reduce a water pressure at the NOEFV by diverting a water flow around the NOEFV based on a restrictive flow through the NOEFV.

A method for saving water in a shower enclosure system including sensing a bather's position within the shower enclosure to one of a restrictive flow zone and a full flow zone, a relative location of the zones programmable by the bather. The method also includes restricting an amount of water reaching a shower head in the shower enclosure via a normally open electromagnetic fluid valve (NOEFV) configured to operate based on a position of the bather detected by the sensor. The method further includes diverting a water flow around the NOEFV via a diversion channel configured to reduce a water pressure at the NOEFV based on a restrictive flow through the NOEFV.

Other aspects and advantages of embodiments of the disclosure will become apparent from the following detailed description, taken in conjunction with the accompanying drawings, illustrated by way of example of the principles of the disclosure herein.

BRIEF DESCRIPTION OF THE DRAWINGS

FIG. 2 illustrates a perspective view of a curtain rod and phone cord arrangement in accordance with an embodiment of the present disclosure.

FIG. 2A illustrates a perspective view of the curtain rod covered with a sleeve concealing a phone cord in accordance with an embodiment of the present disclosure.

FIG. 2B illustrates a cross section view of the curtain rod with the phone cord taped on its underside to allow a hanging curtain ring to slide through in accordance with an embodiment of the present disclosure.

FIG. 2C illustrates a perspective view of a split open curtain rod sleeve in accordance with an embodiment of the present disclosure.

FIG. 3 illustrates a perspective view of a standing shower enclosure in accordance with an embodiment of the present disclosure.

FIG. 3A illustrates a perspective view of bridge bar for dressing a phone cord that spans the shower door in accordance with an embodiment of the present disclosure.

FIG. 5A illustrates an interior view of the electromagnetic fluid valve showing an orifice cap at an inlet of the diversion channel in accordance with an embodiment of the present disclosure.

FIG. 5B illustrates a perspective view of the orifice cap in accordance with an embodiment of the present disclosure.

FIG. 6 illustrates an enlarged perspective view of an installed normally open electromagnetic fluid valve in between a shower arm and a showerhead in accordance with an embodiment of the present disclosure.

FIG. 7 illustrates a wiring diagram of the shower system in accordance with an embodiment of the present disclosure.

Figure 1:
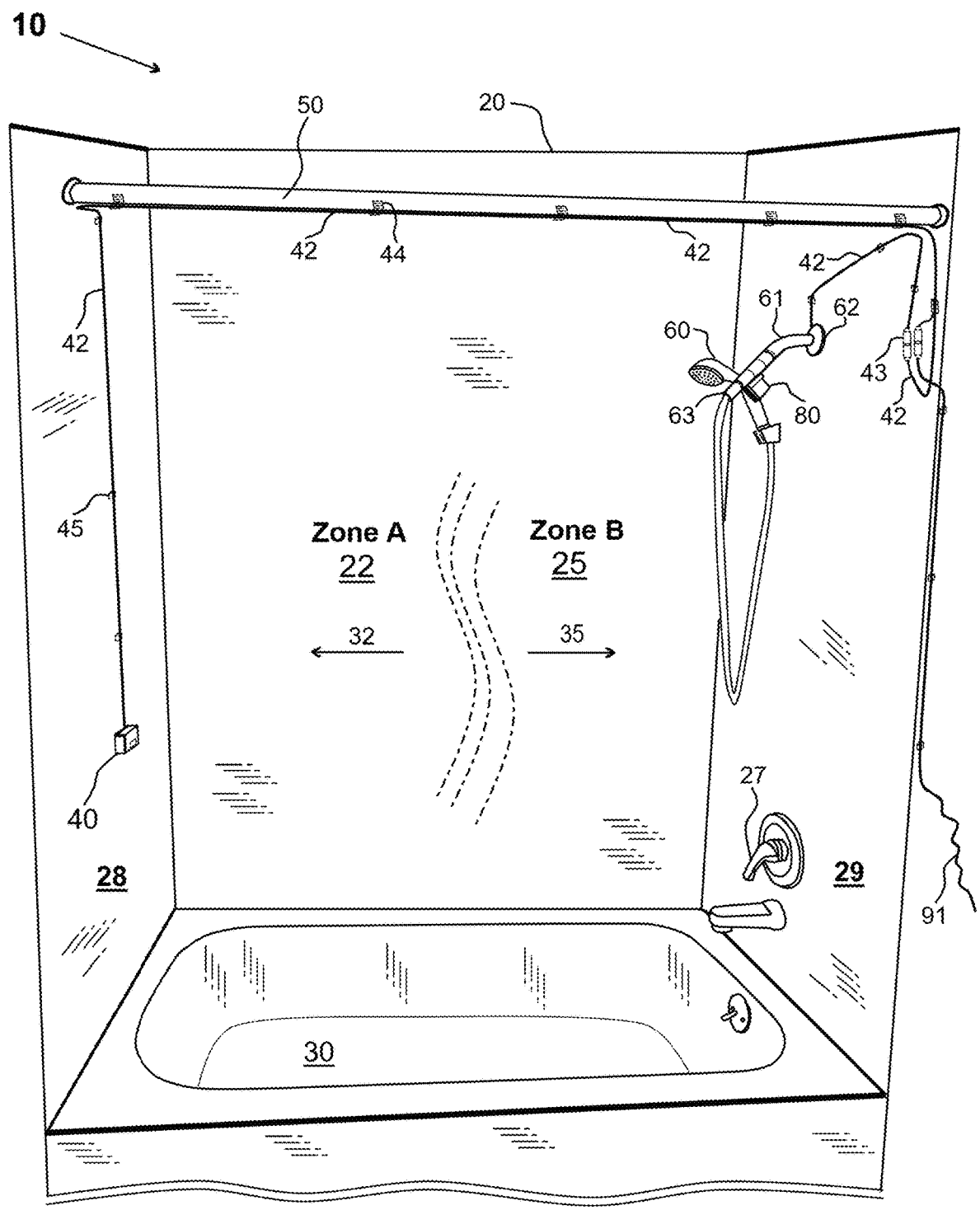
FIG. 1 illustrates a perspective view of an electronically controlled water saving shower system in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

The invention comprises dual zone sensing. The shower enclosure is electronically partitioned into two separate zones. The free-flow zone is 100% unrestricted flow and the restrictive flow zone reduces flow from a trickle to complete shut off. The invention further comprises a proximity sensor which emits an electromagnetic field or a beam of electromagnetic radiation to detect a bather who is in its dedicated water flow restrictive zone. Once detected, the sensor signals the normally open electromagnetic valve to a closed position as long as the bather remains in the restrictive flow zone. The closed valve prohibits water reaching the showerhead.

The invention further comprises a dedicated water free-flow zone within the shower enclosure. The proximity sensor ignores the existence of a bather who is within the free-flow zone. This allows water flowing through the normally open electromagnetic valve to reach the showerhead.

The proximity sensor aims at a showerhead location which is usually at an opposite side of a shower wall immediately adjacent the sensor. The sensor beam scans the space between the two partitioned zones only, and results in an absolute minimal error of unintended water flow shut off to the showerhead. The exact distance the sensor beam travels is adjustable and may define the width of both zones.

The invention allows use of preexisting installed showerheads. The simple installation design and procedure are for general public installation and do not require trained trade personnel or assistants.

The invention further comprises a method of installing a phone cord that carries power to a sensor and to an electromagnetic valve situation in a shower enclosure and a shower over a bath type tub enclosure. The method hides the phone cord out of sight from the bather and others. The invention does not required the bather to be present under the showerhead to obtain water flow versus a conventional water saving shower systems that requires a bather to stands under the showerhead. Conventional systems create an undesirable burden on a bather who must be under the showerhead regardless in cold or warm weather.

The invention further comprises a normally open electromagnetic valve. The valve further comprises a diversion stabilizer channel that assures water pressure and temperature remain stable during an interim shutoff period. During the shutoff period, standing hot water in the plumbing pipeline has nowhere to go. Pressure builds up, and forces heated water to enter into unheated water pipes. Upon the water valve reopening, the higher pressure heated water dominates colder water and may cause a bather to experience a brief moment of hotter than usual water. After the pressure stabilizes, the water temperature will come back to normal.

A diversion channel provides a passage to vent heated water to avoid overheating. The diversion channel also helps maintain tank-less on-demand water heaters that require minimum water flow for sustaining equipment operation normal during shutoff of water flow. The diversion channel further minimizes water pipe damage due to rapid shutoff action caused by the pilot diaphragm acting on the electromagnetic valve. The diversion channel provides a diversion path for the inrush of hot water. Without the channel, a big banging noise will be heard due to a hammer-effect.

The invention also comprises a removable orifice that is capped on the channel and flow rate that can be adjusted to match various brands of tank-less water heaters. The invention further comprises a power adapter that converts utility AC (alternating current) to direct current. The direct current delivers power to the proximity sensor via a telephone cord that is thin and easily navigated through door frames and walls during installation.

The invention further comprises a battery module. The battery module is optional for operational convenience in the event AC utility power is not available. The invention further comprises a solar charging station. The solar charging station recharges the battery module and is optional for operational convenience if there is a window for solar access inside the shower enclosure.

FIG. 1 depicts a complete shower enclosure over a tub 30 including a water saving showerhead system 10 in accordance with an embodiment of the present disclosure. The system 10 has three sections, sidewall 28, back wall 20 and another sidewall 29. Back wall 20 and bathtub 30 are electronically partitioned into two zones.

Towards the left, closer to sidewall 28 is restrictive zone A22 and towards the right, closer to sidewall 29 is free flow zone B25. At about three feet (92 cm) up from a base of bathtub 30 is installed a proximity sensor 40 on sidewall 28. The proximity sensor 40 transmits a beam of invisible electromagnetic radiation (active infrared) aimed across the bathtub 30 at the opposite sidewall 29. An electromagnetic activated fluid valve 80 is inserted between a shower arm 61 and the showerhead 60 which is installed high on sidewall 29. The fluid valve 80 is configured normally open to allow a free flow of water 88 (always open when there is no electric power applied on the solenoid coil 82). Utility AC power 90 is converted to a low voltage and a low current DC via phone cord 91. The phone cord delivers power to connector 43 and continues on through curtain rod 50 and finally terminates on sensor 40. The phone cord 42 runs on the underside of curtain rod 50. Clear adhesive tape 44 is used to affix the cord 42 securely onto the rod 50. Each end of tape 44 terminates at about a 10 and a 2 o'clock position such that the curtain hanging ring 57 can slide freely without catching the tape 44. Double sided adhesive clips 45 are fixed to the cord 42 on wall 28, 29 and wall 20.

In operation, a bather turns on faucet 27 to set a water flow rate and a temperature. Water will flow to showerhead without the bather being present inside the enclosure 10. As long as the bather is not inside zone A22, water will come from showerhead 60. When the bather decides he doesn't need water, he simply walks toward zone A22 to stop water as the direction arrow 32 indicates. When bather needs water, he simply walks toward zone B25 to resume water flow as direction arrow 35 shows. The resumed water will have the same temperature and flow rate without any readjustment on faucet 27.

Turning to FIG. 2 is an enlarged view of curtain rod 50, phone cord 42 that carries power and signal to sensor 40 and showerhead 80, affixed on an underside of rod 50 with clear adhesive tape 44 according to an embodiment of the present invention. The cord 42 can be fixed on the back wall 20 if the aesthetics of the installed system 10 are not important. However, it is more desirable to hide the cord 42.

A more preferred way to hide the cord 42 is shown on FIG. 2A with a split open in sleeve 55 shown on FIG. 2C. A sleeve 55 covered rod 50 is shown on FIG. 2A. A cross section view shown on FIG. 2B detailed the tape 44 holding the cord 42 and the ends of tape 44 which stop at about 10 and 2 o'clock position to avoid catching the sliding ring 57.

Figure 4:
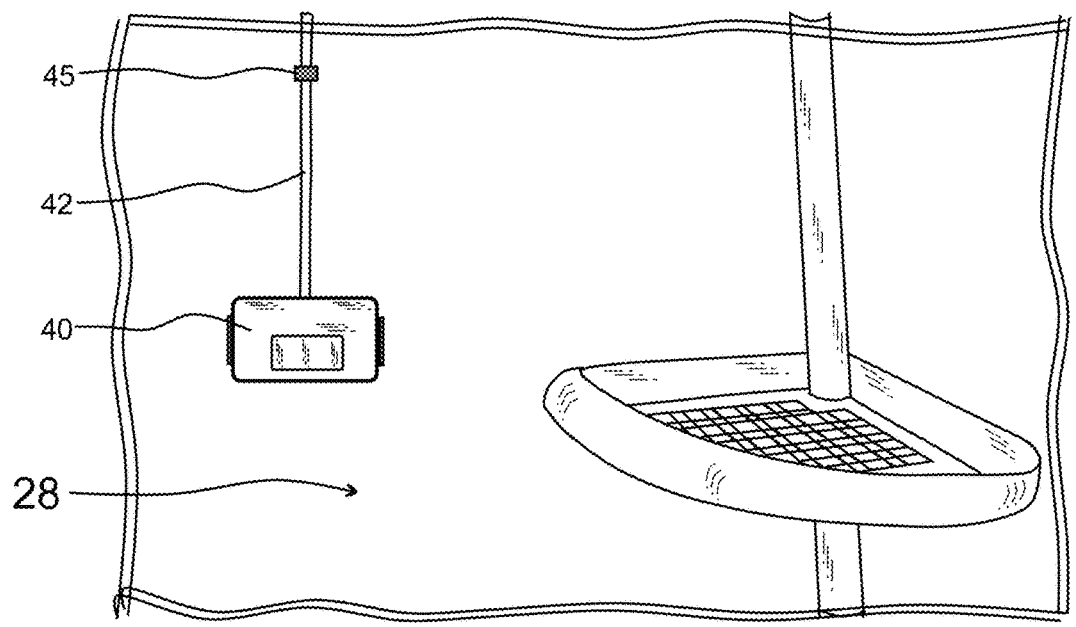
FIG. 4 illustrates an elevation view of an installed proximity sensor on a shower wall in accordance with an embodiment of the present disclosure.

An alternate standing shower enclosure 70 is shown in FIG. 3 in accordance with an embodiment of the present disclosure. The installation of sensor 40 and showerhead 80 is identical to that of system 10. However, the system 70 utilizes a bridge bar 72 to dress the phone cord 42 as shown on FIG. 3A. The bar 72 bridges across the door 71 opening. Clips 73 and 74 are clamped on each side of the glass panels. Sensor 40 emits infrared beams towards the showerhead 60 direction then receives it back if it encounters an obstacle on its path. The distance from sensor 40 to an obstacle (bather) can be preset to define the restrictive zone 22. FIG. 4 shows a relative size of shower basket and sensor 40 mounted on sidewall 28.

Figure 5:
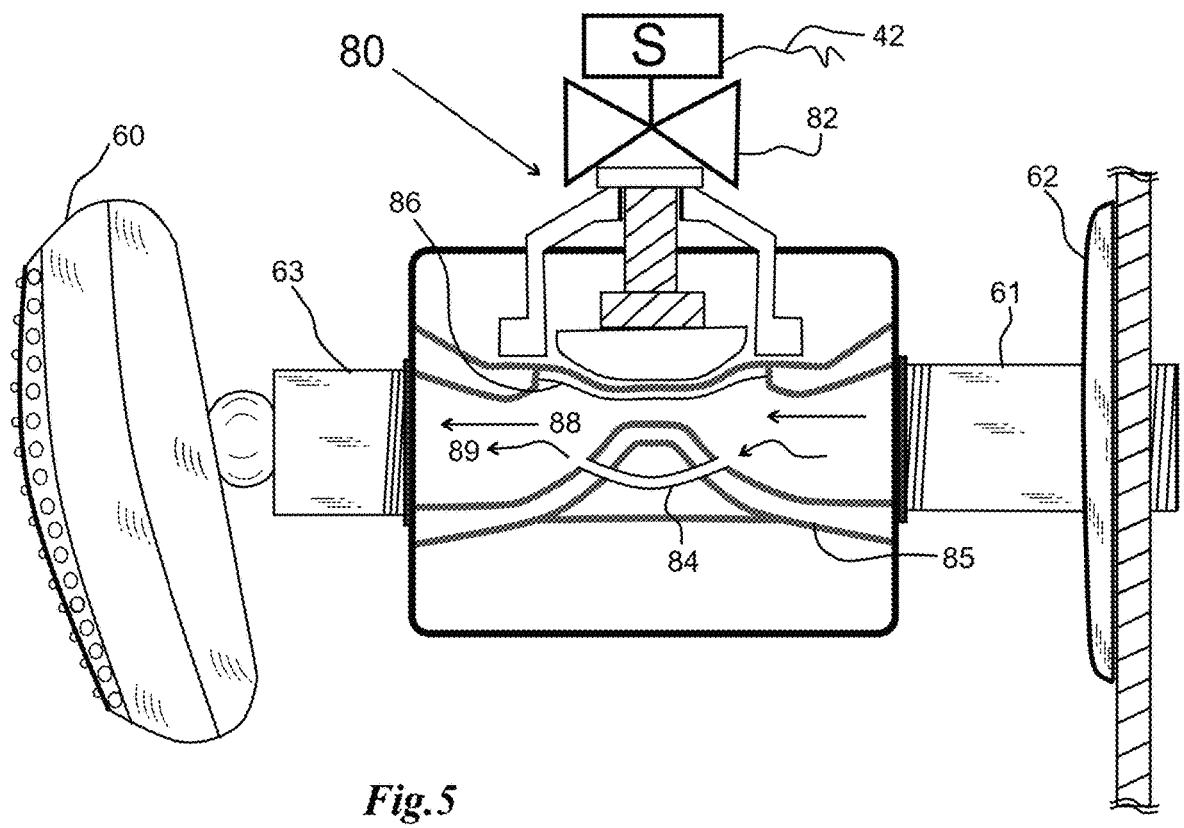
FIG. 5 illustrates an interior view of the normally open electromagnetic fluid valve with a diversion channel in accordance with an embodiment of the present disclosure.

A water saving showerhead 60 assembly is shown on FIG. 5 in accordance with an embodiment of the present disclosure. The normally open electromagnetic fluid valve assembly 80 is installed between showerhead coupling 63 that connects to showerhead 60 and to the shower arm 61. The valve 80 is controlled by an electromagnetic operated solenoid 82 which takes power from sensor 40 via the phone cord 42. The valve body 85 is part of the assembly 80 which comprises a diversion channel 84.

Upon activation of solenoid 82, the diaphragm 86 moves downward, stopping the water flow to showerhead 60 in response to a bather's presence in the restrictive zone 22. To maintain proper operation of an on-demand tank-less water heater and stable water temperature when water flow resumes to showerhead 60, a diversion channel 84 is provided. The diversion channel 84 allows a small amount of water 89 to continuously pass through the valve body 85 to maintain the preset proper temperature when the bather resumes showering. The diversion channel 84 also serves to reduce or eliminate the water hammer effect when the valve 80 abruptly shuts off water supply to the shower head 60.

A valve body 85 is part of the electromagnetic valve 80 and includes an orifice cap 87 installed on a water entrance side of the diversion channel 84 shown in FIG. 5A. The orifice cap 87 shown in FIG. 5B is preset at the factory to allow 0.5 gallon per minute water flow to maintain the on-demand tank-less water heater continuous running to prevent flame out during the period of valve 80 being shut off. Cap 87 can also be readjusted to match a water heater manufacturer's recommendation.

Turning to FIG. 6 is an enlarged perspective view of showerhead 60 and shutoff valve 80 as installed on side wall 29 in accordance with an embodiment of the present disclosure. Showerhead 60 is a handheld model or a fixed stationary model that is preexisting and can be reused per the present disclosure. Therefore all functions included in an off the shelf conventional showerhead 60 are retained including but not limited to low flow, massage action and the like will not be lost. For new home construction, the phone cord 42 may be made invisible by threading it through shower arm cover 62 and through routes behind shower walls 29, 20 and 28 to reach the power supply 90 and sensor 40.

System 10 wiring is shown on FIG. 7 according to an embodiment of the present disclosure. The system 10 runs on low voltage direct current from an AC adapter 90 and routes to sensor 40. Sensor 40 connects to solenoid 82 of the valve 80. A battery 100 can be used as system backup or operates the system 10 if an AC power source is unavailable. Alternatively, a solar power charger 200 can be connected to battery 100 if a window is accessible within the shower enclosure.

Figure 8:
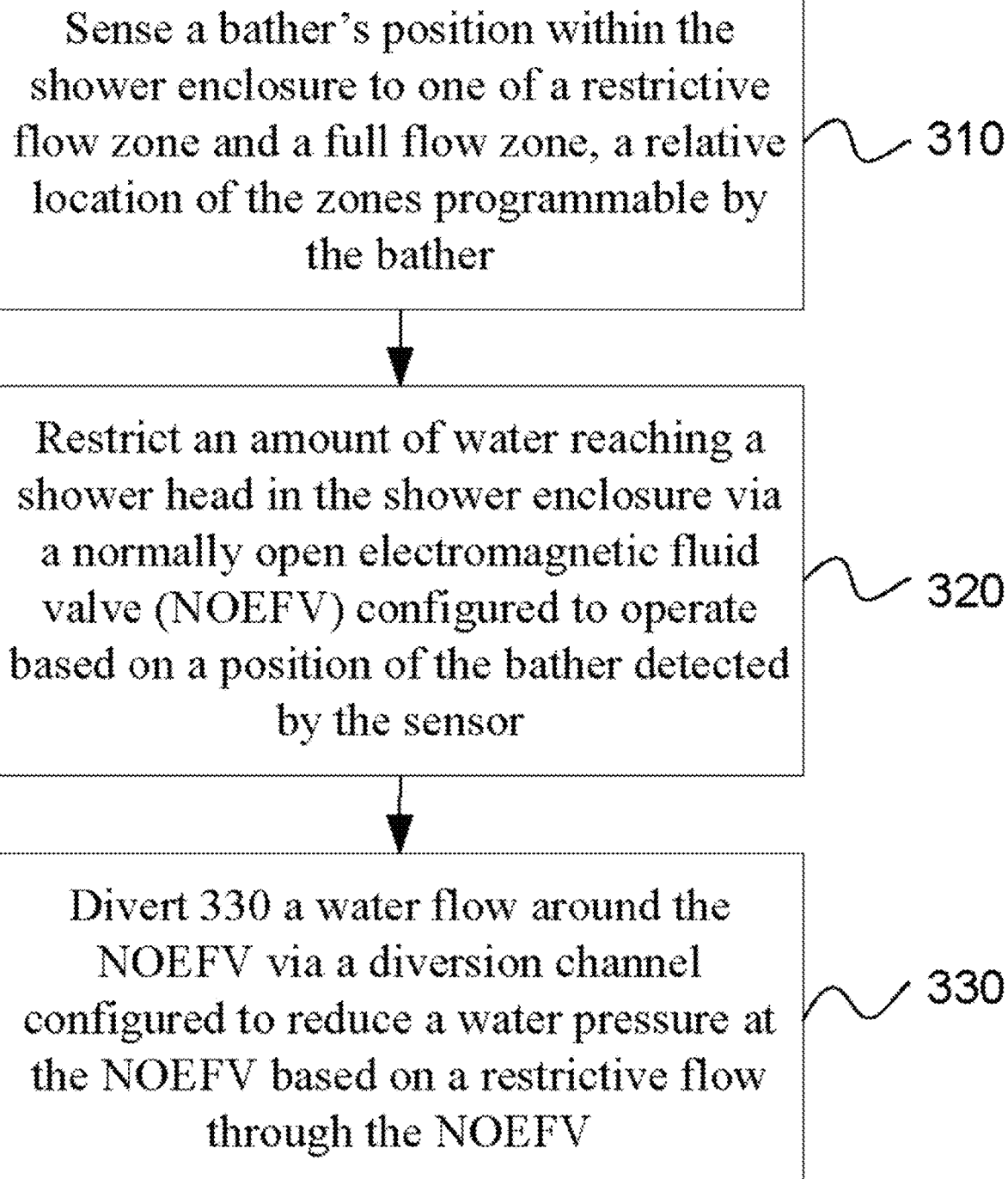
FIG. 8 illustrates a method of saving water using the shower enclosure system in accordance with an embodiment of the present disclosure.

FIG. 8 illustrates a method of saving water using the shower enclosure system in accordance with an embodiment of the present invention. The method includes sensing 310 a bather's position within the shower enclosure to one of a restrictive flow zone and a full flow zone, a relative location of the zones programmable by the bather. The method also includes restricting 320 an amount of water reaching a shower head in the shower enclosure via a normally open electromagnetic fluid valve (NOEFV) configured to operate based on a position of the bather detected by the sensor. The method further includes diverting 330 a water flow around the NOEFV via a diversion channel configured to reduce a water pressure at the NOEFV based on a restrictive flow through the NOEFV.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. A water saving shower enclosure system, comprising:
   a normally open electromagnetically activated fluid valve (NOEFV) configured to restrict a water flow there through to a shower head coupling in the shower enclosure system based on a position of a bather therein detected by a sensor; and
   a diversion channel configured to be continuously open to reduce a water pressure at the NOEFV by continuously diverting a portion of the water flow around the NOEFV to the shower head coupling whether the NOEFV is closed or open,
   wherein the diversion channel, from an inlet to an outlet, is defined in a valve body 180 degrees opposite a diaphragm closure of the NOEFV.

2. The water saving shower enclosure system of claim 1, wherein a water flow in a restrictive flow zone varies from a trickle to a complete shutoff and a water flow in a full flow zone is unrestricted by the NOEFV.

3. The water saving shower enclosure system of claim 1, wherein the shower enclosure comprises shower walls over a bath tub and a standing shower stall.

4. The water saving shower enclosure system of claim 1, further comprising a shower faucet configured to set a water flow rate and temperature by the bather.

5. The water saving shower enclosure system of claim 1, further comprising a solar power source for an electrical operation of the system.

6. The water saving shower enclosure system of claim 1, wherein the NOEFV comprises a solenoid in an open position for full fluid flow in the absence of any electrical power.

7. The water saving shower enclosure system of claim 1, wherein the continuously diverted portion of the water flow around the NOEFV is longer than the water flow through the NOEFV.

8. The water saving shower enclosure system of claim 1, further comprising a restrictive cap disposed on a tube adjacent an inlet of the diversion channel, the restrictive cap configured to allow a predetermined number of pounds per square inch water flow there through.

9. The water saving shower enclosure system of claim 1, further comprising a restrictive cap disposed on a tube adjacent an inlet of the diversion channel, the restrictive cap configured to counteract a water hammer effect based on a rapid closing of the NOEFV.

10. The water saving shower enclosure system of claim 1, further comprising a restrictive cap disposed on a tube adjacent an inlet of the diversion channel, the cap configured to preadjust to a fluid flow and a fluid pressure required by an operation of an on-demand tank-less water heater.

11. The water saving shower enclosure system of claim 1, wherein the diversion channel is configured to enable a constant water temperature and a constant water pressure for the bather despite an interim period of time in a restrictive flow zone.

12. A water saving shower enclosure system, comprising:
a sensor configured to track a bather and a position of the bather to a flow zone within the shower enclosure to one of a restrictive flow zone and a full flow zone, a relative location of the zones is adjustable by the bather;
a normally open electromagnetically activated fluid valve (NOEFV) configured to restrict a water flow there through to a shower head in the shower enclosure based on the position of the bather detected by the sensor; and
a diversion channel configured to be continuously open to reduce a water pressure at the NOEFV by continuously diverting a portion of the water flow around the NOEFV whether the NOEFV is closed or open, and from an inlet to an outlet, is defined in a valve body 180 degrees opposite a diaphragm closure of the NOEFV,
and wherein the continuously diverted portion of the water flow around the NOEFV is longer than the water flow through the NOEFV.

13. The water saving shower enclosure system of claim 12, wherein the sensor is an ultrasound transceiver configured to track the bather's position within the enclosure based on a distance from the sensor to the bather.

14. The water saving shower enclosure system of claim 12, wherein the NOEFV receives an activation command from the sensor based solely on a detection of the bather in the restrictive flow zone.

15. The water saving shower enclosure system of claim 12, wherein the sensor is one of an active and a passive infrared sensor configured to track the bather's position within the enclosure based on a distance from the sensor to the bather.

16. A method of saving water in a shower enclosure system, the method comprising:
sensing a bather and a bather's position in a flow zone within the shower enclosure to one of a restrictive flow zone and a full flow zone, a relative location of the zones is adjustable by the bather;
restricting a water flow reaching a shower head in the shower enclosure via a normally open electromagnetically activated fluid valve (NOEFV) configured to operate based on a position of a bather detected by the sensor; and
continuously diverting a portion of the restricted water flow around the NOEFV via a diversion channel configured to be continuously open to reduce a water pressure at the NOEFV whether the NOEFV is closed or open,
wherein the continuously diverted portion of the restricted water flow, from an inlet to an outlet, is defined in a valve body 180 degrees opposite a diaphragm closure of the NOEFV.

17. The method of saving water in a shower enclosure system of claim 16, further comprising dressing a power delivery cord by affixing the power cord on underside of a curtain rod with tapes at a 10 and a 2 o'clock position to prevent sliding curtain rings catching the tapes.

18. The method of saving water in a shower enclosure system of claim 16, further comprising making a power cord invisible under a plastic elongated sleeve with a slit.

19. The method of saving water in a shower enclosure system of claim 16, further comprising dressing a power delivery cord via a bridge bar configured to span across a shower door opening to prevent the power cord interfering in a shower door movement.

* * * * *